UNITED STATES PATENT OFFICE.

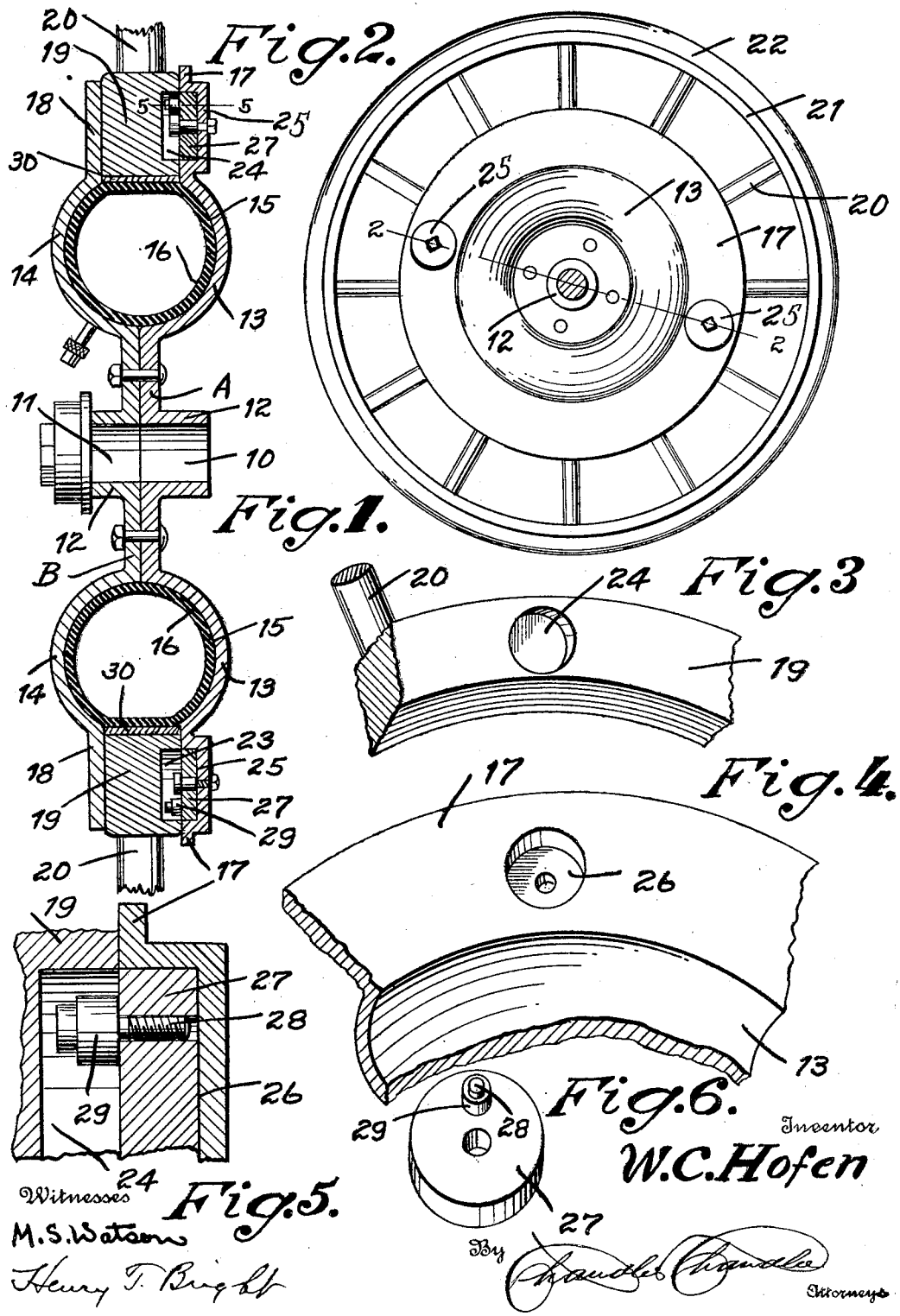

WILLIAM C. HOFEN, OF SAN FRANCISCO, CALIFORNIA.

VEHICLE-WHEEL.

1,102,406.

Specification of Letters Patent. Patented July 7, 1914.

Application filed July 25, 1913. Serial No. 781,166.

*To all whom it may concern:*

Be it known that I, WILLIAM C. HOFEN, a citizen of the United States, residing at San Francisco, in the county of San Francisco, State of California, have invented certain new and useful Improvements in Vehicle-Wheels; and I do hereby declare the following to be a full, clear, and exact description of the invention, such as will enable others skilled in the art to which it appertains to make and use the same.

This invention relates to vehicle wheels and particularly to those of the resilient type adapted for use in connection with motor vehicles.

The object of the invention resides in the provision of a vehicle wheel of the type named in which the resiliency thereof is effected through the medium of an air cushion, and said cushion protected from wear and strains at all times.

A further object of the invention resides in the provision of a vehicle wheel in the character named which will possess all the advantages of the pneumatic tire wheel and at the same time obviate the disadvantages of such wheels in that it will not be liable to disablement from puncture.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a side elevation of a vehicle wheel constructed in accordance with the invention; Fig. 2, a section on the line 2—2 of Fig. 1; Fig. 3, a detail perspective view of a fragment of the inner rim; Fig. 4, a detail perspective view of a fragment of the inner plate employed in the wheel; Fig. 5, a section on the line 5—5 of Fig. 2, and Fig. 6, a detail perspective view of one of the rotatable disks carried by the inner plate.

Referring to the drawings the wheel is shown as comprising circular plates A and B connected together side to side and provided centrally with openings 10 and 11 respectively disposed in registration and surrounded by outwardly directed flanges 12 whereby a hub portion is formed for the reception of an axle. The plates A and B are provided respectively with oppositely disposed outwardly curved circular portions 13 and 14 which form a channel 15 and mounted in this channel is a pneumatic tube 16. The plates A and B outwardly of the portions 13 and 14 terminate in parallel spaced portions 17 and 18 respectively between which is slidably mounted an inner rim 19. Surrounding the inner rim 19 and connected with the latter by means of spokes 20 is an outer rim 21 upon which is mounted a tire 22 of any suitable material. The inner rim 19 is provided at diametrically opposite points with circular recesses 23 and 24, said recesses being formed in the side of the rim 19 adjacent the plate A. Formed on the portion 17 of the plate A are pockets 25 and 26 having closed outer ends and open inner ends, said pockets alining respectively with the recesses 23 and 24 and being of a diameter corresponding to the diameter of said recesses. Rotatably mounted in each of the pockets 25 and 26 is a disk 27 which carries a pin 28 projecting into respective recesses 23 and 24. Rotatably mounted on each pin 28 is a sleeve 29 adapted for engagement with the circular wall of the recess into which said pin projects. The inner edge of the inner rim 19 has secured thereto a canvas lining 30 which engages the tube 16, the friction between the shoe 30 and the tube 16 when the latter is fully inflated being ample to prevent relative rotation between the rim 19 and the plates A and B in the use of the wheel.

Should the tube 16 become partially deflated or the driving strain become too great the tube 16 will slide over the canvas shoe 30 until the sleeves 29 engage the circular walls of respective recesses 23 and 24 and the rim 19 and plates A and B will then be locked together for rotation in unison. It will be obvious that the plates A and B and the rim 19 can move relatively to each other in a radial direction at all times, such movement arising under the influence of shocks and jars incident to travel, the tube 16 serving to absorb such shocks and jars whereby the comfort of the occupants of the vehicle is enhanced.

What is claimed is:—

A wheel comprising a pair of circular plates connected together side to side and having central openings therein to form an axle bearing, said plates further having oppositely disposed outwardly curved circular portions the outer ends of which terminate in straight parallel spaced portions, a pneumatic tube seated in the channel formed by the outwardly curved portions of the plate, an inner rim slidably mounted between the parallel spaced portions, said inner rim being provided with circular recesses in one side thereof, and the straight portion of the plate adjacent the recessed side of the inner rim being provided with circular pockets, disks rotatably mounted in said pockets respectively, pins mounted eccentrically on said disk and projecting into respective recesses of the inner rim, rollers journaled on said pins respectively for engagement with the side walls of respective recesses of the inner rim, an outer rim surrounding said inner rim, and spokes connecting the outer and inner rims.

In testimony whereof, I affix my signature, in the presence of two witnesses.

WILLIAM C. HOFEN.

Witnesses:
W. W. HEALEY,
ZOE HARRISON.

---

Copies of this patent may be obtained for five cents each, by addressing the "Commissioner of Patents, Washington, D. C."